United States Patent
Gal et al.

(10) Patent No.: US 11,119,895 B2
(45) Date of Patent: Sep. 14, 2021

(54) RISK-FOCUSED TESTING

(71) Applicant: International Business Machines Corporation, Armonk, NY (US)

(72) Inventors: Raviv Gal, Kamon (IL); Gil Shurek, Haifa (IL); Giora Simchoni, Bethlehem Haglilit (IL); Avi Ziv, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 16/543,635

(22) Filed: Aug. 19, 2019

(65) Prior Publication Data

US 2021/0056009 A1    Feb. 25, 2021

(51) Int. Cl.
   *G06F 11/36* (2006.01)
   *G06F 8/71* (2018.01)
   *G06K 9/62* (2006.01)
   *G06N 20/00* (2019.01)

(52) U.S. Cl.
   CPC ............ *G06F 11/3664* (2013.01); *G06F 8/71* (2013.01); *G06F 11/362* (2013.01); *G06F 11/3676* (2013.01); *G06F 11/3688* (2013.01); *G06K 9/6257* (2013.01); *G06N 20/00* (2019.01)

(58) Field of Classification Search
   USPC ......................................................... 717/124
   See application file for complete search history.

(56) References Cited

U.S. PATENT DOCUMENTS

| | | | |
|---|---|---|---|
| 9,176,729 B2 | 11/2015 | Mockus et al. | |
| 9,354,867 B2 | 5/2016 | Jain et al. | |
| 2007/0016542 A1* | 1/2007 | Rosauer | G06N 5/022 706/21 |
| 2012/0072247 A1* | 3/2012 | Rosauer | G06Q 10/04 705/4 |
| 2016/0116378 A1* | 4/2016 | Bates | G06N 3/084 702/182 |
| 2017/0091071 A1* | 3/2017 | Chitale | G06F 11/008 |
| 2017/0286280 A1* | 10/2017 | Algie | G06F 3/0647 |
| 2018/0267886 A1 | 9/2018 | Durga et al. | |
| 2018/0276584 A1 | 9/2018 | Woulfe et al. | |
| 2019/0026663 A1* | 1/2019 | Homeyer | G06Q 10/06316 |
| 2019/0034830 A1* | 1/2019 | Burangulov | G06N 20/00 |
| 2019/0171524 A1* | 6/2019 | Algie | G06F 11/3051 |
| 2019/0187689 A1* | 6/2019 | Celia | G05B 19/41845 |
| 2019/0235744 A1* | 8/2019 | Burpulis | G06F 40/197 |
| 2019/0258756 A1* | 8/2019 | Minwalla | H04L 41/142 |
| 2019/0260795 A1* | 8/2019 | Araiza | G06F 3/0486 |

\* cited by examiner

*Primary Examiner* — John Q Chavis
(74) *Attorney, Agent, or Firm* — Ziv Glazberg

(57) ABSTRACT

A method, apparatus and product for testing a system under development. The method comprises obtaining information including a current version of a code, and predicting that a subset of code elements from the current version of the code are bug-prone elements. The method comprises determining one or more coverage events corresponding to the bug-prone elements. The method further comprises determining a testing policy based on the one or more coverage events that correspond to the bug-prone elements, wherein the testing policy is determined based on a statistical analysis of coverage likelihood of tests generated based on a test template for each coverage event of the one or more coverage events. The method further comprises implementing the testing policy.

20 Claims, 3 Drawing Sheets

RISK-FOCUSED TESTING

TECHNICAL FIELD

The present disclosure relates to system testing in general, and to methods, products and systems of testing a system under development, in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion, such as 70%, of the development cycle to discover erroneous behaviors of the computerized device.

During the testing phase, a sample of all possible behaviors of the computerized device is inspected. Coverage tools for checking software and hardware components of the device provide a measure of how well the software being evaluated has been exercised during testing and verification and thereby give a level of assurance that the device is of high quality.

BRIEF SUMMARY

One exemplary embodiment of the disclosed subject matter is a method comprising iteratively performing: obtaining information including a current version of a code, the information including fault-related information indicating at least previously detected faults in a previous version of the code, the information including test-related information indicating at least previously performed tests of the previous version of the code; based on a machine learning algorithm, predicting that a subset of code elements from the current version of the code are bug-prone elements; determining one or more coverage events corresponding to the bug-prone elements; determining a testing policy based on the one or more coverage events that correspond to the bug-prone elements, wherein the testing policy is determined based on a statistical analysis of coverage likelihood of tests generated based on a test template for each coverage event of the one or more coverage events, wherein the testing policy includes a plurality of test templates and execution parameters thereof, wherein the testing policy is configured to statistically cover the one or more coverage events; and implementing the testing policy, wherein the implementing includes generating one or more tests based on the plurality of test templates, thereby covering the one or more coverage events, wherein a first testing policy for a first set of bug-prone elements determined during a first iteration includes different test templates than a second testing policy for a second set of bug-prone elements determined during a second iteration.

Another exemplary embodiment of the disclosed subject matter is a computer program product including a non-transitory computer readable storage medium retaining program instructions, which program instructions when read by a processor, cause the processor to iteratively perform a method including: obtaining information including a current version of a code, the information including fault-related information indicating at least previously detected faults in a previous version of the code, the information including test-related information indicating at least previously performed tests of the previous version of the code; based on a machine learning algorithm, predicting that a subset of code elements from the current version of the code are bug-prone elements; determining one or more coverage events corresponding to the bug-prone elements; determining a testing policy based on the one or more coverage events that correspond to the bug-prone elements, wherein the testing policy is determined based on a statistical analysis of coverage likelihood of tests generated based on a test template for each coverage event of the one or more coverage events, wherein the testing policy includes a plurality of test templates and execution parameters thereof, wherein the testing policy is configured to statistically cover the one or more coverage events; and implementing the testing policy, wherein the implementing includes generating one or more tests based on the plurality of test templates, thereby covering the one or more coverage events, wherein a first testing policy for a first set of bug-prone elements determined during a first iteration includes different test templates than a second testing policy for a second set of bug-prone elements determined during a second iteration.

Yet another exemplary embodiment of the disclosed subject matter is a computerized apparatus having a processor, the processor being adapted to iteratively perform the steps of: obtaining information including a current version of a code, the information including fault-related information indicating at least previously detected faults in a previous version of the code, the information including test-related information indicating at least previously performed tests of the previous version of the code; based on a machine learning algorithm, predicting that a subset of code elements from the current version of the code are bug-prone elements; determining one or more coverage events corresponding to the bug-prone elements; determining a testing policy based on the one or more coverage events that correspond to the bug-prone elements, wherein the testing policy is determined based on a statistical analysis of coverage likelihood of tests generated based on a test template for each coverage event of the one or more coverage events, wherein the testing policy includes a plurality of test templates and execution parameters thereof, wherein the testing policy is configured to statistically cover the one or more coverage events; and implementing the testing policy, wherein the implementing includes generating one or more tests based on the plurality of test templates, thereby covering the one or more coverage events, wherein a first testing policy for a first set of bug-prone elements determined during a first iteration includes different test templates than a second testing policy for a second set of bug-prone elements determined during a second iteration.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
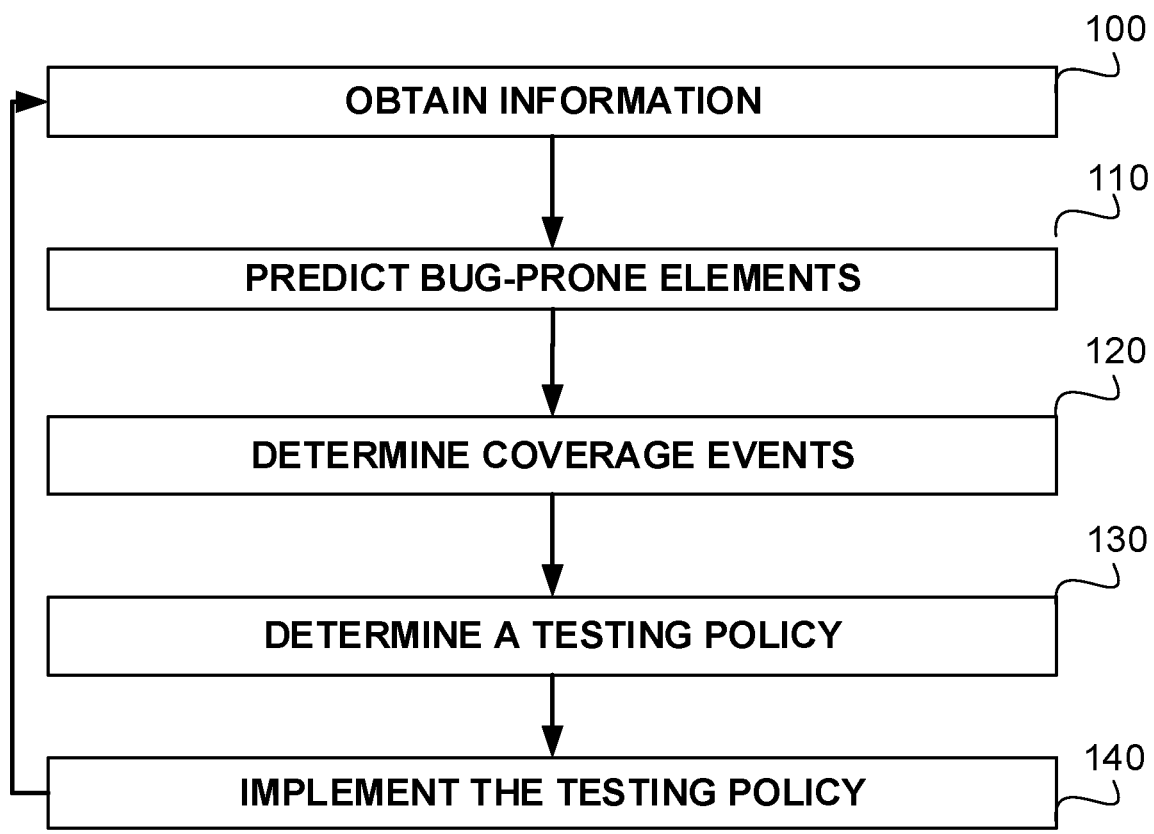
FIG. 1 shows a flowchart of a method, in accordance with some exemplary embodiments of the disclosed subject matter.

One technical problem dealt with by the disclosed subject matter is verifying a system under development. In some exemplary embodiments, it may be advantageous to identify bug-prone areas of a system under development, e.g., and verify them. In some exemplary embodiments, it may be difficult to identify bug-prone areas of a system under development, for example, since changes to elements of the system such as functions, features, and files may affect other elements or areas of the system.

Another technical problem dealt with by the disclosed subject matter is addressing and handling bug-prone areas (also referred to as "bug-prone elements", "files at risk", "areas at risk", and "risky areas") of a system under development, e.g., to ensure the system functions properly. In some exemplary embodiments, certain elements of the system, such as certain functions, features, files, or the like, which are likely to be faulty or problematic, may be determined to be bug-prone elements. In some exemplary embodiments, an element that does not function properly, as intended, or the like, may be referred to as "faulty", "problematic", having a "bug" or having a "defect". It is noted that a bug-prone element may or may not have a bug. The existence or non-existence of a bug may be determined after the system under development is verified, tested, checked, or the like.

Another technical problem dealt with by the disclosed subject matter is alerting a user that a file he committed introduced a bug into the system. In some exemplary embodiments, the committed element may be bug-prone, may cause other areas of the system to become bug-prone, or the like. For example, a programmer may wish to be alerted that a file he committed has caused a bug to surface in the same element or in another element. Additionally or alternatively, the programmer may wish to be alerted in case the committed file has a high probability of causing neighbor files or associated files to become bug-prone, even in case the existence of such bug has not been proven.

In some exemplary embodiments, a development process, e.g., of a system, may be characterized by frequent and continuous changes at all levels, including requirements, design, code and tests. Specifically, the development process may be characterized by an iterative process of enhancing or adding features to the system, fixing bugs or faults, and implementing a variety of tests to verify the system and its components.

In some exemplary embodiments, it may be advantageous to focus on testing or verifying a subset of risky elements of the system such as bug-prone elements rather than testing an entire set of elements of the system. In some exemplary embodiments, it may be advantageous to focus on testing or verifying the bug-prone elements rather than testing a subset of elements that do not have a high risk of being faulty or problematic. In one example, testing an entire system may be time consuming and computationally expensive. In another example, testing a subset of non-risky elements of a system may leave out the majority of bugs or faults of the system, thus wasting time and computation power without achieving a verification goal.

In some exemplary embodiments, it may be difficult to identify bug-prone elements when the system is continuously changing, e.g., since a modification to a function, feature, or file of the system may affect other areas in the system and cause them to become bug-prone areas.

In some exemplary embodiments, a naïve method for identifying bug-prone elements or areas in a continuously changing system may include identifying bug-prone elements manually. For example, a qualified project team may use its expertise and experience to manually identify risk areas by identifying complex areas in the system, areas with a lot of previous problems, or the like. Once these areas are identified, manual measures may be taken to address the risk by performing code reviews, focusing a verification process on these areas, or the like. In some exemplary embodiments, a major drawback of the naïve method is a high cost, e.g., since the naïve method may be time consuming and require expert knowledge.

An alternative automated naïve solution may be based on history of testing, such as by compiling a list of tests that identified bugs in the past, and assigning them with priorities based on past performance. However, such a naïve solution may focus on tests that previously identified bugs, instead of focusing the limited resources on tests that would uncover new bugs.

One technical solution of the disclosed subject matter is to iteratively identify and verify bug-prone elements in a continuously changing system under development, e.g., automatically. In some exemplary embodiments, an automatic method implemented iteratively may be configured to obtain information of the system under development from one or more sources and generate focused tests to verify identified bug-prone elements.

In some exemplary embodiments, the automatic method may include obtaining information including a current version of a code, for example, from a version control system. In some exemplary embodiments, the information may include fault-related information indicating previously detected faults or bugs in one or more previous versions of the code, for example, from a bug tracking tool. In some exemplary embodiments, the information may include test-related information indicating previously performed tests of the one or more previous versions of the code, for example, from a test submission tool. In some exemplary embodiments, the information may include any other system-related information.

In some exemplary embodiments, the automatic method may include obtaining the information of the system under development from one or more version control systems such as Git™, Apache Subversion™, Mercurial™, Concurrent Version System (CVS)™, or the like, which may be utilized to track changes in system files, and to allow branches and merges of system files, or other committable elements.

In some exemplary embodiments, version control systems may track versions of the code. The tracked versions of the code may enable developers to keep an entire history or repository of the code. Changes may be committed to the repository together with remarks and explanations, identification of the developer that changed the code, or the like. Changes may later on be reverted, if determined to be unsuccessfully, either in combination with other changes or separately therefrom. In some cases, version control systems may provide statistics about a number of changed code files per commit, number and content of modified, added or removed code lines, as well as free text comments.

In some exemplary embodiments, the fault-related information of the continuously changing system may be obtained from a bug tracking tool such as ClearQuest™, Airbrake™, or the like. In some exemplary embodiments, the bug tracking tool may provide at least one file having a previously detected fault, a timestamp or date of detecting the fault, an estimated severity of the detected fault, or the like. Users, including developers and non-developers, may open tickets in the bug tracking tool, in response to identification of a bug. When a bug is fixed, the bug tracking tool may be updated accordingly to indicate that the bug was fixed and by who.

In some exemplary embodiments, the test-related information of the continuously changing system may be obtained from a test submission tool. In some exemplary embodiments, the test submission tool may provide a count or a total number of previously performed tests before a last file was committed or before a last iteration, and a number of failed or successful tests as a percentage of the performed tests. In some exemplary embodiments, the test-related information may include template information regarding test templates that were used for the failed or successful tests, and their achieved coverage.

In some exemplary embodiments, a test template may describe a test flow, while introducing a randomness to the test. In some exemplary embodiments, a random-test-generator may use the directives defined in the test template to make random decisions in generating the concrete test. For example, if a test template aims to verify a multiple operation, then the test template can include executing K multiple operations. The test template may define a directive to control the sign of each operand (e.g., positive, zero or negative), by defining "weight" for each option. The random-test-generator may use the directive and the weights to produce the K multiple operations. Each time the random-test-generator may generate a different test having K multiple operations that adhere to the requirements of the test template. In some exemplary embodiments, the random-test-generator may define a Constraint Satisfaction Problem (CSP) based on the test template, and utilize a CSP solver to determine concrete values that meet the requirements of the test template, thereby defining a random test that adheres to the constraints defined in the test template. In some exemplary embodiments, soft constraints in the CSP may be utilized to implement directives relating to the biasing the end-result, such as biasing randomness using weights. In some exemplary embodiments, the relation between a test template and coverage can be probabilistic. In the example above, if our coverage event is "the outcome of the multiplication is 0", then a test template that will give "zero" value high weight is likely to hit this event, while a different test template that gives it 0-weight will not be able to hit this event at all, and another test template that gives it a low weight may hit this event, in a low likelihood. It is also noted that different tests generated from the same test template may not necessarily hit the same events. It is further noted that the example above is a simplistic example where the relationship between the definitions in the test template and the coverage event is straightforward. In real-life examples, the relationship may not be so easily identifiable and controlled, such as a relationship that is based on a chain of indirect properties that cannot be controlled directly by a directive in the test template.

In some exemplary embodiments, the information may be obtained from any other source relating to the system under development.

In some exemplary embodiments, the automatic method may predict, for elements in the system under development, whether or not the elements are estimated to be bug-prone. In some exemplary embodiments, the automatic method may include predicting, based on a machine learning algorithm or any other classification module, that a subset of code elements from the current version of the code includes bug-prone elements. For example, the subset of code elements may include a file of the system under development, and it may be predicted that the file is a bug-prone file.

In some exemplary embodiments, the machine learning algorithm may be configured to identify areas at risk of the system under development. The machine learning algorithm may be trained on a large dataset including information, that may be obtained from the system under development and labeled according to a fault history of each element in the dataset. In some exemplary embodiments, the dataset may include information obtained from version control systems, bug tracking tools, test submission tools or the like, over a training period of time.

In some exemplary embodiments, the automatic method may include determining one or more coverage events corresponding to the bug-prone elements, also referred to as "identified coverage events". In some exemplary embodiments, coverage analysis may be applied and a set of coverage events may be defined, such as using functional coverage, line coverage, function coverage, branch coverage, or the like. Coverage analysis may be employed to determine "how well" testing had covered different aspects of the system under development. In some exemplary embodiments, coverage events that correspond to the bug-prone elements may be identified and utilized. Such coverage events may be, for example, coverage events that comprise the bug-prone elements or correspond to the bug-prone elements being reached, executed, or the like. In some exemplary embodiments, the identified coverage events may be utilized to assess coverage of a testing performed up to a given point, e.g., using simulation techniques for functional verification of processors and systems. For example, during testing, the coverage goal may be to cover all of the coverage events that correspond to the bug-prone elements. Additionally or alternatively, a reduced coverage goal, such as of about 90% of the coverage events, may be defined. Hence, sufficient coverage may be reached even if not all coverage events are covered, as long as there is sufficient coverage of the identified coverage events.

In some exemplary embodiments, the automatic method may include determining a testing policy based on the identified coverage events that correspond to the bug-prone elements. In some exemplary embodiments, the testing policy may be configured to statistically cover the identified coverage events. The testing policy may be determined based on a statistical analysis of coverage likelihood or probability of tests, that may be generated by a test template generator, to cover each coverage event of the one or more coverage events.

In some exemplary embodiments, the testing policy may select test templates having a high probability of covering (also referred to as "hitting") the identified coverage events, for example, according to accumulated template-related information. In some exemplary embodiments, the testing policy may include a plurality of test templates and execution parameters thereof such as an order of execution, a number of executions per test, generation parameters, or the like. The plurality of test templates, when executed with the execution parameters, may be configured to statistically cover the identified coverage events.

In some exemplary embodiments, the automatic method may include implementing the testing policy. In some exemplary embodiments, the testing policy may be implemented by generating one or more tests based on the plurality of test templates. The number of tests generated based on each template, generation parameters thereof, or the like, may be determined based on the testing policy. During testing, coverage of the identified coverage events may be tracked to determine whether the coverage goal was reached. Additionally or alternatively, the coverage goal may be assumed to be reached when the testing policy is implemented in full. During testing, bugs may be identified, such as due to the system under development failing to correctly perform functionalities associated with some of the generated tests.

In some exemplary embodiments, different iterations may identify and test different areas of the system under development, e.g., a first testing policy for a first set of bug-prone elements determined during a first iteration may include different test templates than a second testing policy for a second set of bug-prone elements determined during a second iteration.

In one example, a programmer may commit a file A to a version control system, thereby invoking an iteration. During the iteration, the automatic method may determine that the modifications to file A rendered file B as bug prone. Accordingly, test templates which are configured to cover events corresponding to file B are selected and a testing policy is defined based thereon. After file B is committed, a new iteration may find that the modifications in file B have caused files C, D, and E to become bug-prone. Therefore, s the automatic method may select test templates which are configured to cover events corresponding to files C, D, and E and determine a new testing policy based thereon. Tests may be generated accordingly. In some cases, test templates for file B may partly or fully overlap test templates for files C, D, and E. In other cases, test templates for file B may not have any overlap with test templates for files C, D, and E. Additionally or alternatively, the testing policy employed in the first iteration may be completely different from that of the second iteration in terms of test templates being included and their respective number of executions. Both testing policies may be determined based on different coverage events, that are in turn associated with different bug-prone elements.

In some exemplary embodiments, a new iteration may be invoked every time a new coding element is committed, e.g., in a version control system, whereby each iteration may be configured to test a committed version of the code. For example, a developer committing a file may invoke a new iteration. The iteration may be used to verify that the new committed file does not introduce a new bug. If such a bug is introduced, it is identified quickly so as to allow the developer to quickly resolve it.

It is noted that executing all tests or even all test templates with each commit, may not be feasible as such testing would require extensive resources and would delay development efforts substantially. The disclosed subject matter, on the other hand, may provide for an efficient, focused, testing that requires relatively a small amount of resources, and which could be useful for identifying bugs early on without creating a hurdle on the development cycle.

In one example, when determining tests to be performed, the automatic method may take into account an estimated severity of detected faults, e.g., obtained from a bug tracking tool. In some exemplary embodiments, each bug-prone element may be categorized with a different estimated severity. In some exemplary embodiments, the coverage goals may be defined differently with respect to different estimated severities, such as ensuring all severely-bug-prone elements are tested and providing a reasonable coverage for minor-bug-prone elements.

In some exemplary embodiments, upon committing a file, the automatic method may be configured to provide a real time alert indicating the committed element introduced a bug, a bug having an estimated severity above a threshold, or the like.

In some exemplary embodiments, a new iteration may be invoked periodically, such as weekly, monthly, or the like, thereby performing adaptive regression testing. For example, a new iteration may be invoked every determined time period, e.g., every week, resulting in a different regression testing being performed, based on the content of the elements that were committed during the time period.

In some exemplary embodiments, the automatic method may be configured to provide to a user a list of all the bug-prone elements identified by the machine learning algorithm, corresponding risk scores, a list of bug-prone elements having a risk score above a threshold, or the like. Additionally or alternatively, the automatic method may provide a list of identified bugs. In some exemplary embodiments, the identified bugs may be added automatically to the bug tracking system for tracking. Additionally or alternatively, in case the committed element that introduced a bug is revoked in the version control system, the disclosed subject matter may automatically remove the bugs that were identified based thereon from the bug tracking system. Additionally or alternatively, regression testing may be performed, and each bug to be removed may be considered as a bug-prone element to be tested. As an example, the same coverage event that corresponds to the test that found the bug, may be added to the list of identified coverage events, even if such coverage event does not correspond to any bug-prone element.

One technical effect of the disclosed subject matter may be automating a risk analysis and a risk handling process of a system under development while accurately identifying bug prone elements and while eliminating a need to exhaustively test all elements of the system under development. By identifying bug prone elements in real time and focusing the testing on the bug prone elements, a computational cost may be reduced and there may be no requirement for special expertise or testing knowledge.

Another technical effect of the disclosed subject matter may be providing real time alerts indicating that a committed file introduced a bug, such that the committing developer may perform immediate remedial actions before the committed file affects other areas of the system.

Yet another technical effect may be to utilize a cross-system platform to identify bug-prone elements. Instead of attempting to directly identify coverage elements to be covered, the disclosed subject matter may utilize information from systems, such as version control system, bug tracking system, a testing submission tool, or the like, to identify bug-prone elements in the system under development. Based on the identification of such bug-prone elements, coverage events that correspond to the identified bug-prone elements may be determined and used to devise a testing policy, for generating tests using templates so as to cover the coverage events that correspond to the identified bug-prone elements.

In some exemplary embodiments, each iteration may provide for an adaptive regression testing, that is based on a repository of test templates (also referred to as "tests database"), and that is used differently in each iteration to stimulate and exercise different aspects of the system under development. In each iteration, the regression testing is focused on aspects that are estimated as having a relatively high likelihood of introducing bugs, based on the modifications made to the system, since the previous iteration.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1 showing a flowchart diagram of a method, in accordance with some exemplary embodiments of the disclosed subject matter.

On Step 100, information regarding the system under development may be obtained. In some exemplary embodiments, the information may be obtained from one or more systems that are utilized in the development of the system under development. The system under development may be a software system, a hardware system, a combination thereof, or the like. The system may be developed using a formal language, such as Java, C, System-C, VHSIC Hardware Description Language (VHDL), System Verilog, Property Specification Language (PSL), or the like. The system may be composed of elements, such as lines, functions, files, or the like. For the sake of simplicity of the present disclosure, and without limiting the disclosed subject matter, the present disclosure refers to "files" as a general term representing elements in the system under development.

In some exemplary embodiments, the obtained information may include a current version of a code and one or more previous versions of the code, for example, obtained from a version control system that tracks changes in the system during a testing period. In some cases, the obtained information may include a list of changes (e.g., outcome of a "diff" command) between the current version of the code and the one or more previous versions of the code, a date of committing each file and code line to the version control system, an identifier of a committer, free text comments, a number of lines which have been added, deleted or modified, or any other version control data.

In some exemplary embodiments, the obtained information may include fault-related information, e.g., indicating previously detected faults in the one or more previous versions of the code, for example, obtained during the testing period from a bug tracking tool that tracks defects in the system, such as ClearQuest™. In some exemplary embodiments, the fault-related information may include at least one file having a previously detected fault, a timestamp or date of detecting the fault, an estimated severity of the detected fault, or the like.

In some exemplary embodiments, the obtained information may include test-related information, e.g., indicating previously performed tests of the one or more previous versions of the system. Such information may be obtained from a test submission tool, that may monitor and track such information during the testing period. In some cases, the test-related information may include a count or total number of tests executed before a last file was committed or before a last iteration, their corresponding types, a percentage or a count of failed or successful tests from the previously performed tests, or the like.

In some exemplary embodiments, the obtained information may be configured to be obtained during the testing period which may include a period of time, up to a current time, e.g., starting from a past week, a past number of days, a past month, or any other past period. In some exemplary embodiments, the testing period may be user selected, automatically determined, preconfigured, or the like.

On Step 110, based on a machine learning algorithm, it may be predicted that a subset of code elements from the current version of the code are bug-prone elements. For example, it may be predicted that at least one file or function is a bug-prone file or a bug-prone function, respectively.

In some exemplary embodiments, the machine learning algorithm may automatically identify areas at risk in the current version of the code, e.g., using the obtained information from the version control system, the bug tracking system, the test submission tool, or the like.

In some exemplary embodiments, the machine learning algorithm may be a supervised machine learning that is trained based on a training dataset including features obtained from the system under development, e.g., during a training period of time such as two weeks, a month, or the like. In some exemplary embodiments, the machine learning algorithm may be system-specific, or may be trained at least partially based on similar systems.

In some exemplary embodiments, the training dataset may include test-related information, fault-related information, and version control information accumulated over the training period.

In some exemplary embodiments, information for the training dataset may be accumulated during the training period, which may start at any past time such as at a past number of months, weeks or days. In some cases, information for the training dataset may be accumulated during the entire time of the system under development up to a set time. In some exemplary embodiments, the training period may end at a start of testing period, a current time, or any other time period set by the user or predetermined.

For example, version control information in the training dataset may include a number of commits per file in a past week or any other time period. In another example, the version control information may include a number of lines added to a file in a past week or any other time period. In another example, the version control information may include whether or not a commit comment or any other comment of a file includes user selected or predefined keywords such as "fix" or "bug". Such comments may be used to infer that the commit is associated with a bug, or a fix of a bug. The commit information may be correlated to information relating to a bug in the bug tracking tool, such as based on timestamps, based on bug identifiers, or the like. In another example, the version control information may include identities of a file's developers', e.g., identities of developers associated with a committed file. In another example, the version control information may include a number of developers who committed the file in a past month or any other time period.

In another example, fault-related information in the training dataset may include a number of faults or bugs with a high severity score reported for a file in the training period such as during a past 30 days or during any other time period. In another example, the fault-related information may include a number of faults or bugs reported to a file's associated or neighbor files in a past week or any other time period. In another example, the fault-related information may include a number of days or any other time units that past since a last bug was reported.

In another example, test-related information in the training dataset may include a number of tests of a file in the training period such as during a past week or during any other time period. In another example, test-related information in the training dataset may include a percentage of failed tests of a function in a past month or any other time period. Test-related information may be used to infer existence of a bug, and timestamp of the bug being introduced into the system, such as between the last execution of a test that would reach the same bug and which executed correctly and until the execution of the test that failed. In some exemplary embodiments, each commit that was performed in between such timestamps may be indicated as potentially associated with the bug.

In some exemplary embodiments, the machine learning algorithm may be trained using the training dataset to detect risky or bug-prone areas by classifying features of the current version of the code as bug-prone elements or as low risk elements, e.g., thereby providing a classification of the code.

In some exemplary embodiments, each element in the training dataset such as files, lines, and functions, may be labeled based on having at least one fault in a past period or not. In one example, the automatic method may include labelling each feature of the training dataset as having a connection to a bug tracking tool or not.

In some exemplary embodiments, the classification implemented by the machine learning algorithm may be based on an association to a bug, as may be identified from a bug tracking tool, and may be formalized, e.g., as follows:

$$y_i^t = \begin{cases} 1 & \text{if file } i \text{ at time } t \text{ connected to a bug tracking tool} \\ 0 & \text{otherwise} \end{cases} \quad (1)$$

wherein a time t denoted a time period up to the classification, e.g., a number of days up to the classification, and the term "connected" denotes any connection or communication of the file to the bug tracking tool at time t. A connection of the file to the bug tracking tool may indicate that a bug was detected in the file.

In some exemplary embodiments, a connection of the file to the bug tracking tool may be determined based on a content of a comment in a commitment of the file to the bug tracking tool, a content of a comment located in a file text in the bug tracking tool, or the like. In one example, a connection of a file to the bug tracking tool may be determined based on a committed comment such as "Fixed HW365723". In another example, a connection of a file to the bug tracking tool may be determined based on a comment in the file such as "This came from HW365723".

In some exemplary embodiments, the machine learning algorithm may utilize statistical predictions to identify risk areas in the system. For example, the classification may be utilized to determine that code elements of the current version of the code such as functions, files, lines, or the like, are bug-prone elements.

Figure 2:
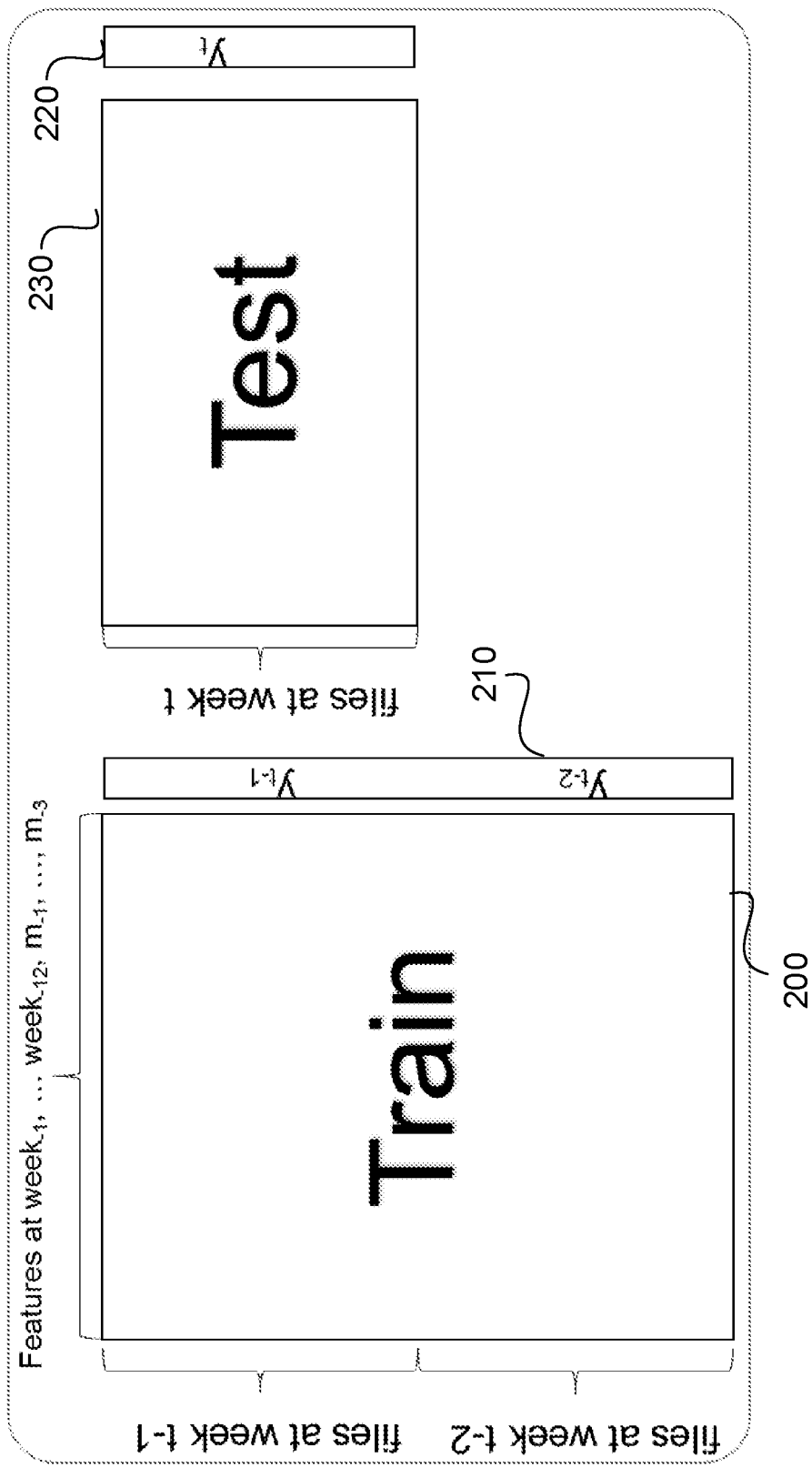
FIG. 2 shows an illustration of machine learning datasets, in accordance with some exemplary embodiments of the disclosed subject matter.

Referring now to FIG. 2 showing an illustration of machine learning datasets, in accordance with some exemplary embodiments of the disclosed subject matter. In some exemplary embodiments, the machine learning algorithm may be trained based on Dataset 200 (e.g., training dataset), and identify risk areas in Dataset 230 (e.g., testing dataset).

In some exemplary embodiments, Dataset 200 may include information accumulated from the system under development over a Training Period 210, while Dataset 230 may include information accumulated from the system under development over a Testing Period 220. In some exemplary embodiments, Training Period 210 may be longer than Testing Period 220, e.g., since training a machine learning algorithm may require a large training dataset. In some exemplary embodiments, information accumulated during Training Period 210 may include older information than information accumulated during Testing Period 220, which may include a current version of the code of the system under development.

In some cases, there may be an overlap between Training Period 210 and Testing Period 220. In other cases, Testing Period 220 may include information accumulated after an end of Training Period 210. For example, Training Period 210 may include a period of time starting from a month prior to the current iteration and ending a week prior to the current iteration, while Testing Period 220 may include a period of time starting from a week prior to the current iteration and ending at the start of the current iteration. In some exemplary embodiments, Training Period 210 may include a period of time starting at any time prior or equal to a start of Testing Period 220.

Referring back to FIG. 1, after detecting the bug-prone elements in the current version of the code, the machine learning algorithm may be configured to provide a risk score of the bug-prone elements, e.g., indicating which bug-prone files are at higher risk of being faulty than other bug-prone files. In some exemplary embodiments, the machine learning may be configured to predict a risk score for a file. A score above a predetermined threshold may indicate that the file is bug-prone. A score may be assigned to every file such that, the higher the score, the higher the estimated risk of the file. Additionally or alternatively, a confidence measurement in the prediction may be provided, so as to indicate how confident the machine learning algorithm is in its classification.

In some exemplary embodiments, the machine learning algorithm may utilize one or more classification techniques, e.g., Gradient Boosted Trees such as XGBOOST, Logistic Regression such as GLMNET, a Recurrent Neural Network (RNN), a Long Short-Term Memory (LSTM) RNN, Random Forests, or any other classification technique.

On Step 120, one or more coverage events corresponding to the bug-prone elements may be determined or identified. In some exemplary embodiments, the coverage events may be selected from a repository of all coverage events associated with the system under development (also referred to as "events database"). In some exemplary embodiments, coverage events may be defined automatically based on the code of the system, such as the case in line coverage, where each line of code is represented by a corresponding coverage event. Additionally or alternatively, the coverage events may be determined automatically using a user-provided specification, such as the case where PSL properties are defined. Each PSL property may define one or more coverage events configured to identify when events associated with the PSL property are reached.

In some exemplary embodiments, the one or more coverage events associated with risky areas may be identified using a static analysis of the bug-prone elements. The static analysis may be configured to identify or select coverage events that are associated with the bug-prone elements from the events database. For example, static analysis may be utilized to identify code lines that correspond to a bug-prone function. Coverage events associated with any of the code lines, such as line coverage events of each of the identified code lines, functional coverage events associated with the elements appearing in the identified code lines, or the like, may be identified and selected. In some exemplary embodiments, the bug-prone elements may be identified on Step 110.

In some exemplary embodiments, the one or more coverage events may include functional coverage events that may be configured to monitor a coverage of various functionalities of the system, e.g., using user-defined cover points and bins. For example, functional coverage may enable a user to monitor whether or not a value was subtracted from a stack or added to the stack. In other embodiments, the one or more coverage events may include any other type of coverage events such as line coverage events, function coverage events, branch coverage events, or the like.

On Step 130, a testing policy may be determined based on the one or more coverage events that correspond to the bug-prone elements, e.g., identified on Step 120. In some exemplary embodiments, the testing policy may be configured to identify tests in the tests database that cover (also referred to as "hit") the identified coverage events. In some exemplary embodiments, the testing policy may be configured to statistically cover the identified coverage events.

In some exemplary embodiments, the testing policy may be determined based on a statistical analysis of coverage likelihood of tests from the tests database. The statistical analysis may include determining a likelihood of tests, when generated by a test template generator, to hit identified coverage events.

In some exemplary embodiments, template-related data may be accumulated as well as coverage event data, e.g., by the test submission tool or by a dedicated component at a server, at a cloud, at the system under development, at a developer's computing device, or at any other location. In some exemplary embodiments, the template-related data and the coverage event data may maintain a connection between an origin test template and a coverage the test template achieves, e.g., to determine a coverage likelihood of the test templates to cover identified coverage events.

In some exemplary embodiments, the template-related data and the coverage event data may be utilized by the testing policy, for example, according to a hit matrix, e.g., as follows:

$$P_{hit} = \underbrace{\begin{pmatrix} \cdots & \cdots & \cdots \\ \cdots & p_{i,j} & \cdots \\ \cdots & \cdots & \cdots \end{pmatrix}}_{Coverage\ Events} \}Test\ Template \quad (2)$$

Wherein $p_{i,j}$ is the probability that a test generated from template i will hit event j.

In some exemplary embodiments, the hit matrix may maintain first order statistics on a coverage of each event by each test template. The statistics includes the probability of hitting the event with a test instance generated from the test template. In some exemplary embodiments, presenting how well a test template meets its verification goals is obtained from the probability of hitting the events associated with the goal. For example, predictions on a coverage rate of a feature may be based on analyzing temporal changes of the coverage events related to the feature.

In some exemplary embodiments, analyzing connections between test templates and their corresponding coverage may be utilized to show descriptive information such as how well a test template (or a set of templates) covers its target verification goal, and provide predictions on how fast a specific feature will be covered, e.g., to alert a user if the coverage rate is not high enough.

In some exemplary embodiments, the testing policy may provide a plurality of test templates and execution parameters thereof. The plurality of test templates may be determined based on a statistical analysis of a hit matrix corresponding to the system under development. In some exemplary embodiments, the execution parameters of the plurality of test templates, when executed, are configured to cover the identified coverage events corresponding to the bug-prone elements. In some cases, the execution parameters may include an order of execution of the plurality of test templates, a number of times each of the plurality of test templates is to be executed, or the like.

On Step 140, the testing policy may be implemented by generating one or more tests based on the plurality of test templates, thereby covering the one or more identified coverage events. In some exemplary embodiments, implementing the one or more tests may provide testing results, e.g., including any bugs found in the bug-prone elements.

In some cases, testing resources for each testing phase may be limited. The testing resources may be limited, for example, based on user definitions, system configurations, or the like. In some exemplary embodiments, the maximal testing time may be limited. As an example, for a system that invokes new iterations periodically, it may be reasonable to set the maximal testing time to be ten hours, a weekend, or the like. However, for a system that invokes a new iteration with each committed file, a shorter testing time may be required, such as no more than one hour, ten minutes, one minute, or the like. In some cases, initial testing may be performed in the foreground, and the user may wait to receive an initial indication that the testing was successful. After such initial testing is completed, additional testing may be performed in the background, while the user may perform other tasks. A report upon completing the additional testing may be provided to the user.

Additionally or alternatively, a user may determine what files or how many files are to be tested, e.g., taking into account the bug-prone elements provided on Step 110. Additionally or alternatively, a user may determine a frequency of generating tests based on the same test template. For example, the user may select a different frequency for a system that invokes new iterations periodically, than for a system that invokes new iterations every time a new coding element is committed. In other cases, the bug-prone elements may be tested automatically, e.g., according to the corresponding execution parameters. In some exemplary embodiments, for a system that invokes new iterations periodically, it may be advantageous to execute the one or more tests in a high frequency. Focusing the tests on the bug-prone elements may reduce the number of generated tests without diminishing the testing effectiveness, thus saving computational power and development time. In some exemplary embodiments, for a system that invokes new iterations every time a new coding element is committed, a total number of tests to run may be very limited. For example, for such a system it may be advantageous to execute only the one or more tests covering the identified coverage events, e.g., in a low frequency.

Figure 3:
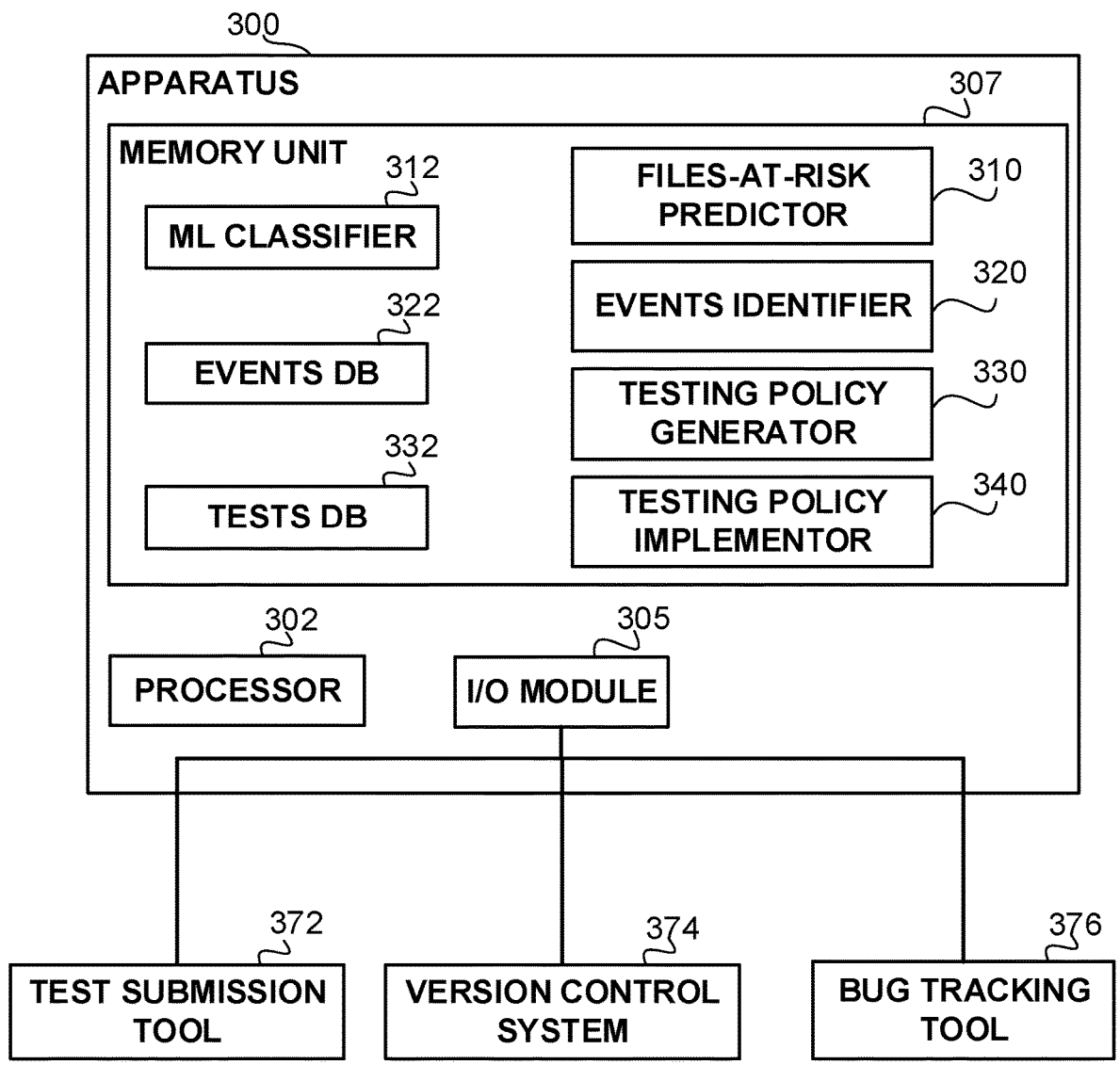
FIG. 3 shows a block diagram of an apparatus, in accordance with some exemplary embodiments of the disclosed subject matter.

Referring now to FIG. 3 showing a block diagram of components of an apparatus, in accordance with some exemplary embodiments of the disclosed subject matter.

In some exemplary embodiments, Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of its subcomponents. Processor 302 may be configured to execute computer-programs useful in performing the method of FIG. 1 or the like.

In some exemplary embodiments of the disclosed subject matter, an Input/Output (I/O) Module 305 may be utilized to provide an output to and receive input from a user. I/O Module 305 may be operatively coupled to a system under development (not shown) intended for inspection or verification, a simulator thereof, an emulator thereof, or the like. I/O Module 305 may be operatively coupled to Bug Tracking Tool 376, Version Control System 374, Test Submission Tool 372, or the like. I/O Module 305 may be operatively coupled to a peripheral device enabling a user to interact with Apparatus 300, such as a display, a keyboard, or the like. I/O Module 305 may further be used to transmit and receive information to and from the user, the system under development, Version Control System 374, Test Submission Tool 372, Bug Tracking Tool 376, or any other apparatus in communication therewith.

In some exemplary embodiments, Apparatus 300 may comprise a Memory Unit 307. Memory Unit 307 may be a short-term storage device or long-term storage device. Memory Unit 307 may be a persistent storage or volatile storage. Memory Unit 307 may be a disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300. In some exemplary embodiments, Memory Unit 307 may retain program code operative to cause Processor 302 to perform acts associated with any of the steps in FIG. 1 above.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

In some exemplary embodiments, Files-At-Risk Predictor 310 may be configured to receive information from Test Submission Tool 372, Version Control System 374, Bug Tracking Tool 376, or the like, e.g., via I/O Module 305. Files-At-Risk Predictor 310 may be configured to predict bug-prone areas of the system under development and corresponding severities based on the received information. Files-At-Risk Predictor 310 may be configured predict that a subset of code elements from a current version of a code of the system under development includes bug-prone elements. The current version of the code of the system under development may be obtained from Version Control System 374, e.g., via I/O Module 305.

In some exemplary embodiments, Files-At-Risk Predictor 310 may utilize Machine Learning Classifier 312 to classify the files of the system as bug prone files or low risk files. Machine Learning Classifier 312 may be trained on a training dataset including data accumulated during a training period from Test Submission Tool 372, Version Control System 374, Bug Tracking Tool 376, or the like. In some exemplary embodiments, every file in the training dataset may be labeled according to whether or not a bug was found in the file during a determined time. In some cases, Files-At-Risk Predictor 310 may utilize any other classifier or predictor to predict the bug-prone areas of the system.

Events Identifier 320 may be configured to identify one or more coverage events that correspond to the bug-prone elements, e.g., provided from Files-At-Risk Predictor 310. In some exemplary embodiments, Events Identifier 320 may define a set of coverage events, such as using functional coverage, line coverage, function coverage, branch coverage, or the like. Additionally or alternatively, Events Identifier 320 may select from an Events Database (DB) 322 coverage events associated with any of the code lines, such as line coverage events of each of the identified code lines, functional coverage events associated with the elements appearing in the identified code lines, or the like. In some exemplary embodiments, Events Identifier 320 may select a functional coverage event that is defined by a specification property, based on the predicates in the specification property. In some exemplary embodiments, if the predicate is affected by the bug-prone element, such as updated by the bug-prone element, its value depends on a value defined in the bug-prone element, or the like, the functional coverage event may be selected as it may be deemed to correspond to the bug-prone element.

Testing Policy Generator 330 may determine a testing policy configured to statistically cover the coverage events selected by Events Identifier 320. Testing Policy Generator 330 may be configured to utilize a coverage likelihood of each coverage event by each test template appearing in Tests DB 332. In some exemplary embodiments, each test template may be utilized to generate a plurality of tests, some of which may hit different coverage events. The total number of generations of tests based on a same test template (or same test template and using a specific set of generation parameters) may be tracked (e.g., by Test Submission Tool 372), and a probability of hitting each coverage task by a test generated based on the test template may be determined. Such statistical information may be utilized to define a testing policy that is configured to cover each of the coverage events selected by Events Identifier 320 by a probability of at least a predetermined threshold. For example, it may be desired to define a testing policy that covers 100 coverage events, each in a probability of at least 90%. If a test template has a probability of 1% to cover a coverage event, it may be utilized 90 times to achieve the desired minimal probabilistic threshold. In some exemplary embodiments, Testing Policy Generator 330 may provide a plurality of test templates and generation parameters thereof to be used for generating tests based thereon.

Testing Policy Implementor 340 may implement the testing policy determined by Testing Policy Generator 330. In some exemplary embodiments, Testing Policy Implementor 340 may generating one or more tests based on the test templates indicated in the testing policy to test the system under development. In some exemplary embodiments, Testing Policy Implementor 340 may utilize generation parameters defined in the testing policy. Additionally or alternatively, testing performed by Testing Policy Implementor 340 may be tracked by Test Submission Tool 372.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    iteratively performing:
        obtaining information comprising a current version of a code, the information comprising fault-related information indicating at least previously detected faults in a previous version of the code, the information comprising test-related information indicating at least previously performed tests of the previous version of the code;
        based on a machine learning algorithm, predicting that a subset of code elements from the current version of the code are bug-prone elements;
        determining one or more coverage events corresponding to the bug-prone elements;
        determining a testing policy based on the one or more coverage events that correspond to the bug-prone elements, wherein said testing policy is determined based on a statistical analysis of coverage likelihood of tests generated based on a test template for each coverage event of the one or more coverage events, wherein the testing policy comprises a plurality of test templates and execution parameters thereof, wherein the testing policy is configured to statistically cover the one or more coverage events; and
        implementing the testing policy, wherein said implementing comprises generating one or more tests based on the plurality of test templates, thereby covering the one or more coverage events,
    wherein a first testing policy for a first set of bug-prone elements determined during a first iteration comprises different test templates than a second testing policy for a second set of bug-prone elements determined during a second iteration.

2. The method of claim 1, wherein the information is obtained from at least one of a version control system, a bug tracking tool, and a test submission tool.

3. The method of claim 1, wherein a new iteration is invoked every time a new coding element is committed.

4. The method of claim 1, wherein a version control system is used to track versions of the code, wherein said iteratively performing comprises performing a new iteration in response to a commit event in the version control system, whereby each iteration is configured to test a committed version of the code.

5. The method of claim 1, wherein a new iteration is invoked periodically, whereby performing adaptive regression testing.

6. The method of claim 1, wherein the machine learning algorithm is configured to be trained on a training dataset comprising coding information, fault-related information, and test-related information obtained during a predefined period of time.

7. The method of claim 5, wherein each element in the training dataset is labeled based on having at least one fault in a past period or not.

8. The method of claim 1, wherein the bug-prone elements comprises at least one of a bug-prone file and a bug-prone function.

9. The method of claim 1, wherein the one or more coverage events comprise one or more functional coverage events.

10. The method of claim 1, wherein the fault-related information comprises a file having a previously detected fault and a timestamp of detecting the fault.

11. The method of claim 1, wherein the test-related information comprises a count of performed tests and a count of failed tests.

12. A computer program product comprising a non-transitory computer readable storage medium retaining program instructions, which program instructions when read by a processor, cause the processor to iteratively perform:
   obtaining information comprising a current version of a code, the information comprising fault-related information indicating at least previously detected faults in a previous version of the code, the information comprising test-related information indicating at least previously performed tests of the previous version of the code;
   based on a machine learning algorithm, predicting that a subset of code elements from the current version of the code are bug-prone elements;
   determining one or more coverage events corresponding to the bug-prone elements;
   determining a testing policy based on the one or more coverage events that correspond to the bug-prone elements, wherein said testing policy is determined based on a statistical analysis of coverage likelihood of tests generated based on a test template for each coverage event of the one or more coverage events, wherein the testing policy comprises a plurality of test templates and execution parameters thereof, wherein the testing policy is configured to statistically cover the one or more coverage events; and
   implementing the testing policy, wherein said implementing comprises generating one or more tests based on the plurality of test templates, thereby covering the one or more coverage events,
   wherein a first testing policy for a first set of bug-prone elements determined during a first iteration comprises different test templates than a second testing policy for a second set of bug-prone elements determined during a second iteration.

13. The computer program product of claim 12, wherein the information is obtained from at least one of a version control system, a bug tracking tool, and a test submission tool.

14. The computer program product of claim 12, wherein a new iteration is invoked every time a new coding element is committed.

15. The computer program product of claim 12, wherein a version control system is used to track versions of the code, wherein said iteratively performing comprises performing a new iteration in response to a commit event in the version control system, whereby each iteration is configured to test a committed version of the code.

16. The computer program product of claim 12, wherein a new iteration is invoked periodically, whereby performing adaptive regression testing.

17. The computer program product of claim 12, wherein the machine learning algorithm is configured to be trained on a training dataset comprising coding information, fault-related information, and test-related information obtained during a predefined period of time.

18. The computer program product of claim 12, wherein the bug-prone elements comprises at least one of a bug-prone file and a bug-prone function.

19. The computer program product of claim 12, wherein the one or more coverage events comprise one or more functional coverage events.

20. A computerized apparatus having a processor, the processor being adapted to iteratively perform:
   obtaining information comprising a current version of a code, the information comprising fault-related information indicating at least previously detected faults in a previous version of the code, the information comprising test-related information indicating at least previously performed tests of the previous version of the code;
   based on a machine learning algorithm, predicting that a subset of code elements from the current version of the code are bug-prone elements;
   determining one or more coverage events corresponding to the bug-prone elements;
   determining a testing policy based on the one or more coverage events that correspond to the bug-prone elements, wherein said testing policy is determined based on a statistical analysis of coverage likelihood of tests generated based on a test template for each coverage event of the one or more coverage events, wherein the testing policy comprises a plurality of test templates and execution parameters thereof, wherein the testing policy is configured to statistically cover the one or more coverage events; and
   implementing the testing policy, wherein said implementing comprises generating one or more tests based on the plurality of test templates, thereby covering the one or more coverage events,
   wherein a first testing policy for a first set of bug-prone elements determined during a first iteration comprises different test templates than a second testing policy for a second set of bug-prone elements determined during a second iteration.

* * * * *